(12) United States Patent
Amirzadeh-Asl et al.

(10) Patent No.: US 7,820,129 B2
(45) Date of Patent: Oct. 26, 2010

(54) METHOD FOR IMPROVING THE DURABILITY OF CARBON OR GRAPHITE ELECTRODES BY USING TIO2—CONTAINING PRODUCTS

(75) Inventors: Djamschid Amirzadeh-Asl, Moers (DE); Dieter Fünders, Dulsburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 673 days.

(21) Appl. No.: 10/571,657

(22) PCT Filed: Sep. 16, 2004

(86) PCT No.: PCT/EP2004/010367

§ 371 (c)(1),
(2), (4) Date: Feb. 7, 2007

(87) PCT Pub. No.: WO2005/034265

PCT Pub. Date: Apr. 14, 2005

(65) Prior Publication Data

US 2008/0048154 A1    Feb. 28, 2008

(30) Foreign Application Priority Data

Sep. 20, 2003    (DE) .............................. 103 43 687

(51) Int. Cl.
*H01B 1/04* (2006.01)
*C25B 11/12* (2006.01)

(52) U.S. Cl. .................. 423/445 R; 423/448; 423/460; 252/502; 252/504; 252/506; 252/507; 252/510; 252/511; 204/294

(58) Field of Classification Search ......... 252/500–507, 252/510, 511; 428/408, 445 R, 448, 460; 204/294; 423/445 R, 448, 460
See application file for complete search history.

(56) References Cited

U.S. PATENT DOCUMENTS

| 3,563,705 | A | * | 2/1971 | Grindstaff et al. ............ 423/266 |
| 3,676,371 | A | * | 7/1972 | Zollner et al. ................ 252/507 |
| 4,140,623 | A | * | 2/1979 | Sooter et al. ................. 208/131 |
| 4,613,375 | A | | 9/1986 | Foerster et al. |
| 4,824,733 | A | | 4/1989 | Dallaire et al. |
| 4,959,139 | A | * | 9/1990 | Blakeburn et al. ............ 208/39 |
| 5,169,718 | A | * | 12/1992 | Miura et al. ................. 428/408 |
| 5,397,450 | A | | 3/1995 | Sekhar et al. |

FOREIGN PATENT DOCUMENTS

| DE | 33 27 251 A1 | 2/1984 |
| EP | 0 436 143 A | 7/1991 |
| JP | 61 096095 A | 5/1986 |
| RO | 103 719 A | 4/1993 |
| SE | 8 800 005 A | 7/1989 |

* cited by examiner

*Primary Examiner*—Mark Kopec
*Assistant Examiner*—Tri V Nguyen
(74) *Attorney, Agent, or Firm*—Fulbright & Jaworski L.L.P.

(57) ABSTRACT

The invention relates to a method for producing carbon or HV graphite electrodes, in which a carbon carrier is mixed with a hydrocarbon-containing binder, and the mixture is subjected to a coking process and/or graphitization process, and one or more synthetic titanium compounds are additionally added to the raw materials. The titanium compound is preferably comprised of $TiO_2$. Iron oxide can be added as an accompanying substance.

5 Claims, No Drawings

METHOD FOR IMPROVING THE DURABILITY OF CARBON OR GRAPHITE ELECTRODES BY USING TIO2—CONTAINING PRODUCTS

This is a §371 of PCT/EP2004/010367 filed Sep. 16, 2004 which claims priority from German Patent Application No. 103 43 687.1 filed Sep. 20, 2003.

The invention relates to a process for improving the durability of carbon or graphite electrodes by the use of products containing $TiO_2$.

Carbon or graphite electrodes are used in many metallurgical processes (e.g. electric furnace, electric-arc furnace) The consumption of these electrodes normally takes place over the lateral surfaces. Numerous attempts to reduce this lateral consumption (=lowering of the consumption rate) have been made hitherto. It is known, for example, to cool the electrodes.

In the production of carbon and graphite electrodes, carbon bearers (e.g. active charcoal, anthracite, petroleum coke or mixtures thereof) are mixed with one or more binders containing hydrocarbons, converted to the appropriate shape and compressed or extruded to form electrode blanks. As required, finely particulate iron oxide bearers (e.g. $Fe_2O_3$) are also added in order to bind any sulfur as FeS. The electrode blanks are then baked in a furnace, during which the binder also turns to coke and a carbon electrode is formed. To further optimize the physical properties such as density (as high as possible), strength (as high as possible) and electrical conductivity (as high as possible), the carbon electrodes can be impregnated, e.g. with pitch, and baked again. This is followed by graphitization in a continuous graphitizing furnace. This process step results in a homogenization of the material properties within the graphite electrode. Another advantage of this procedure is that the penetration of gas and liquid media, such as metals and slags, is reduced in the finished electrode. Another consequence of this, apart from a higher stability of the electrodes, is a reduced lateral consumption rate.

An object of the intention is to overcome the disadvantages of the state of the art and, in particular, to provide a process that allows the production of carbon or graphite electrodes with an improved durability (brought about, inter alia, by a reduced consumption rate). where possible, the other electrode properties (e.g. resistivity, density, flexural strength, cracking behaviour) should not be impaired.

The object is achieved by a process for the production of carbon or graphite electrodes wherein a carbon bearer is mixed with a binder containing hydrocarbons and the mixture is subjected to a coking and/or graphitization process, one or more synthetic titanium compounds additionally being introduced into the raw materials.

It has been found that, in the production of carbon and graphite electrodes or during the use of these electrodes as intended, the addition of one or more synthetic titanium compounds results in the formation of highly refractory compounds, e.g. titanium carbide, titanium nitride or titanium carbonitride, which inhibit attack of the electrodes by oxygen. Furthermore, these compounds are very resistant to attack by liquid metals or slags. The durability of the electrodes is thereby improved.

The synthetic titanium compound can be added to the carbon bearer, the binder or the mixture of carbon bearer and binder. The mixture is then shaped into electrodes and treated further in a known manner.

Alternatively, the synthetic titanium compound can be added to tar pitch. The tar pitch to which the synthetic titanium compound has been added is then used in a known manner to impregnate the electrodes. During the impregnation process the tar pitch, together with, the titanium compound, diffuses into the core of the electrodes, where it fills the open pore volume. In the subsequent thermal treatment of the electrode blank in a furnace, the tar pitch is converted to coke as usual, the added synthetic titanium compounds likewise remaining in the open pore volume.

The synthetic titanium compound used is preferably synthetic $TiO_2$. It can be used as the pure substance or in a mixture with other inorganic substances (companion substances), e.g. iron oxide, silicon oxide, calcium oxide or magnesium oxide.

The synthetic titanium compound is added to the raw materials in a proportion preferably of 0.5 to 30 wt. % and particularly preferably of 1 to 15 wt. % (calculated without any companion substances and based on the total weight of all the raw materials used).

The synthetic titanium compound has a particle size $d_{50}$ preferably of 0.001 µm to 2000 µm and particularly preferably of 0.01 µm to 1500 µm.

In a preferred embodiment of the process, iron oxide, as well as the synthetic titanium compound, is added to the raw materials, it being possible for the iron to be in different oxidation states. The amount of iron oxide added is preferably up to 70 wt. % and particularly preferably 5 to 50 wt. % of the amount of synthetic titanium compound added. The iron oxide has a particle size $d_{50}$ preferably of 0.01 µm to 2000 µm and particularly preferably of 0.1 to 1000 µm.

An advantage of the process according to the invention is that the free pore volume of the electrodes is reduced by the refractory, finely particulate titanium compounds formed (e.g. TiC, TiN, TiCN). This advantageously reduces the attack of gases and liquid media on the electrode matrix and reduces the electrode consumption rate. Furthermore, the reduced pore volume can have an advantageous effect on the cracking behaviour of the electrodes. The reduced pore volume increases the density of the electrodes, advantageously reducing their resistivity. Any sulfur present is bound as FeS by the preferred addition of iron oxide.

The invention claimed is:

1. A process consisting essentially of mixing a carbon bearer with a binder and a synthetic titanium and to form a mixture consisting of the binder, the synthetic titanium and the carbon bearer, and subjecting the mixture to a coking or a graphitization process to form a carbon or graphite cathode.

2. The process of claim 1, wherein the mixture is subject to the coking process.

3. A process consisting of mixing a carbon bearer with a binder and a synthetic titanium and to form a mixture consisting of the binder, the synthetic titanium and the carbon bearer, and subjecting the mixture to a coking or a graphitization process to form a carbon or graphite cathode.

4. A process consisting of mixing a carbon bearer with a binder consisting of a hydrocarbon to form a mixture, introducing at least one synthetic titanium compound into said mixture to form a titanium-containing mixture, subjecting the titanium-containing mixture to a coking process, and forming a carbon or graphite electrode.

5. A process comprising mixing a carbon bearer with a binder consisting of a hydrocarbon to form a mixture, introducing at least one synthetic titanium compound into said mixture to form a titanium-containing mixture, subjecting the titanium-containing mixture to at least one of a coking or graphitization process, and forming a carbon or graphite electrode.

* * * * *